United States Patent [19]
Gritter et al.

[11] Patent Number: 4,590,413
[45] Date of Patent: May 20, 1986

[54] EV DRIVETRAIN INVERTER WITH V/HZ OPTIMIZATION

[75] Inventors: David J. Gritter, Southfield; Walter K. O'Neil, Birmingham, both of Mich.

[73] Assignee: Eaton Corporation, Cleveland, Ohio

[21] Appl. No.: 661,541

[22] Filed: Oct. 16, 1984

Related U.S. Application Data

[63] Continuation of Ser. No. 338,743, Jan. 11, 1982, abandoned, which is a continuation of Ser. No. 186,874, Sep. 12, 1980, abandoned.

[51] Int. Cl.$^4$ .............................................. H02P 5/40
[52] U.S. Cl. ..................................... 318/803; 318/811
[58] Field of Search ................. 318/798, 803, 807–811

[56] References Cited

U.S. PATENT DOCUMENTS

| | | | |
|---|---|---|---|
| 3,723,840 | 3/1973 | Opal et al. | 318/432 |
| 3,819,992 | 6/1974 | Opal et al. | |
| 3,983,463 | 9/1976 | Nabae et al. | 318/803 |
| 3,986,088 | 10/1976 | Zankl et al. | 318/803 |
| 4,039,909 | 8/1977 | Baker | 318/732 |
| 4,158,163 | 6/1979 | Eriksen et al. | 318/798 |
| 4,276,505 | 6/1981 | Bose | 318/717 |

OTHER PUBLICATIONS

Toth, A., "Energy Savings in an Induction Motor Using the 8022 Microcontroller", Intel AP-94.
Eisenhaure et al., "A High Efficiency Controlled Slip Induction Motor Drive for Electrical Vehicles", Conference: Proceedings of the 14th Intersociety Energy Conversion Engineering Conference, Boston, MA, USA, (Aug. 5-10, 1979).

Primary Examiner—David Smith, Jr.
Attorney, Agent, or Firm—C. H. Grace; J. G. Lewis

[57] ABSTRACT

An inverter (34) which provides power to an A.C. machine (28) is controlled by a circuit (36) employing PWM control strategy whereby A.C. power is supplied to the machine at a preselectable frequency and preselectable voltage. This is accomplished by the technique of waveform notching in which the shapes of the notches are varied to determine the average energy content of the overall waveform. Through this arrangement, the operational efficiency of the A.C. machine is optimized. The control circuit includes a microcomputer which calculates optimized machine control data signals from various parametric inputs and during steady state load conditions, seeks a best V/HZ ratio to minimize battery current drawn (system losses) from a D.C. power source (32). In the preferred embodiment, the present invention is incorporated within an electric vehicle (10) employing a 144 VDC battery pack and a three-phase induction motor (18).

9 Claims, 13 Drawing Figures

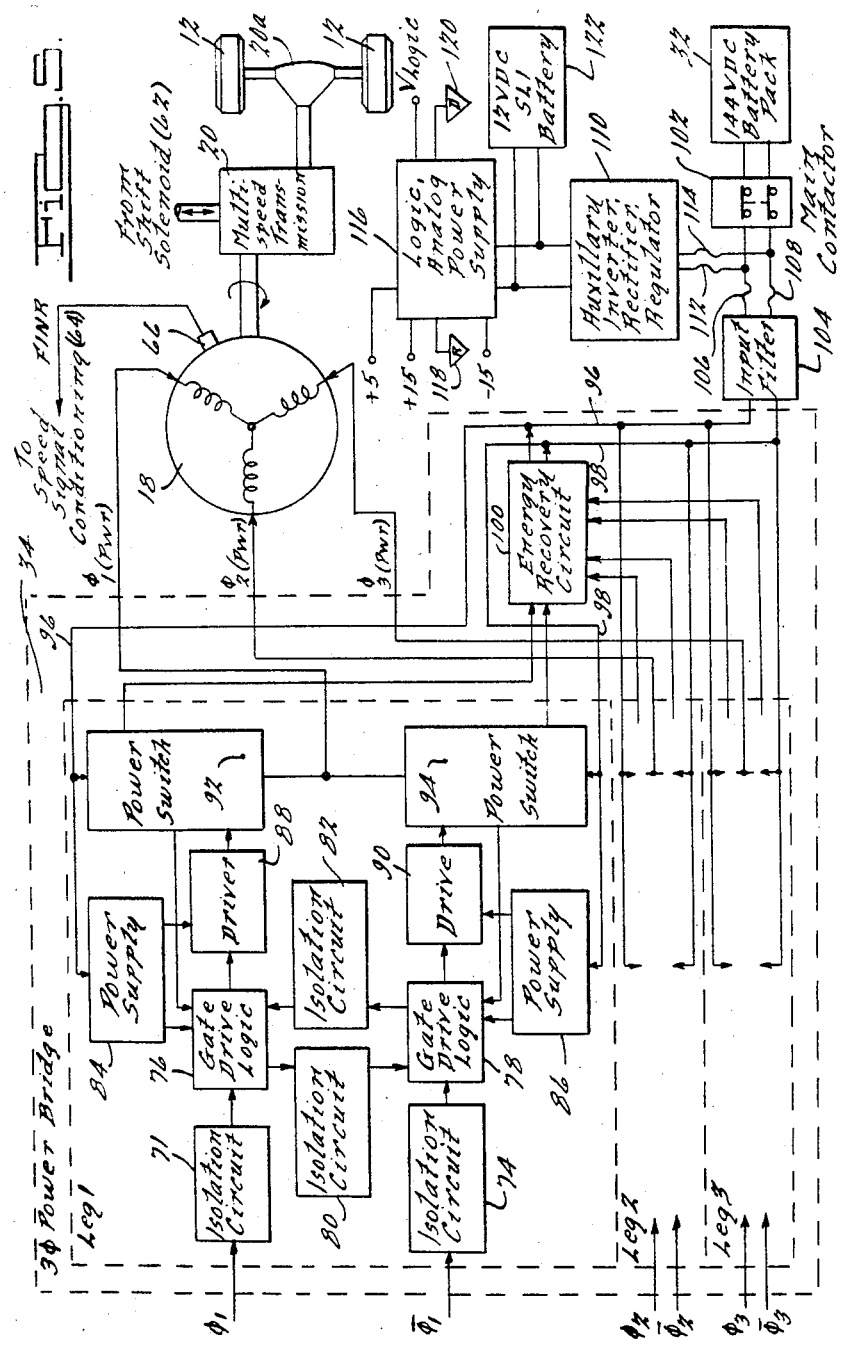

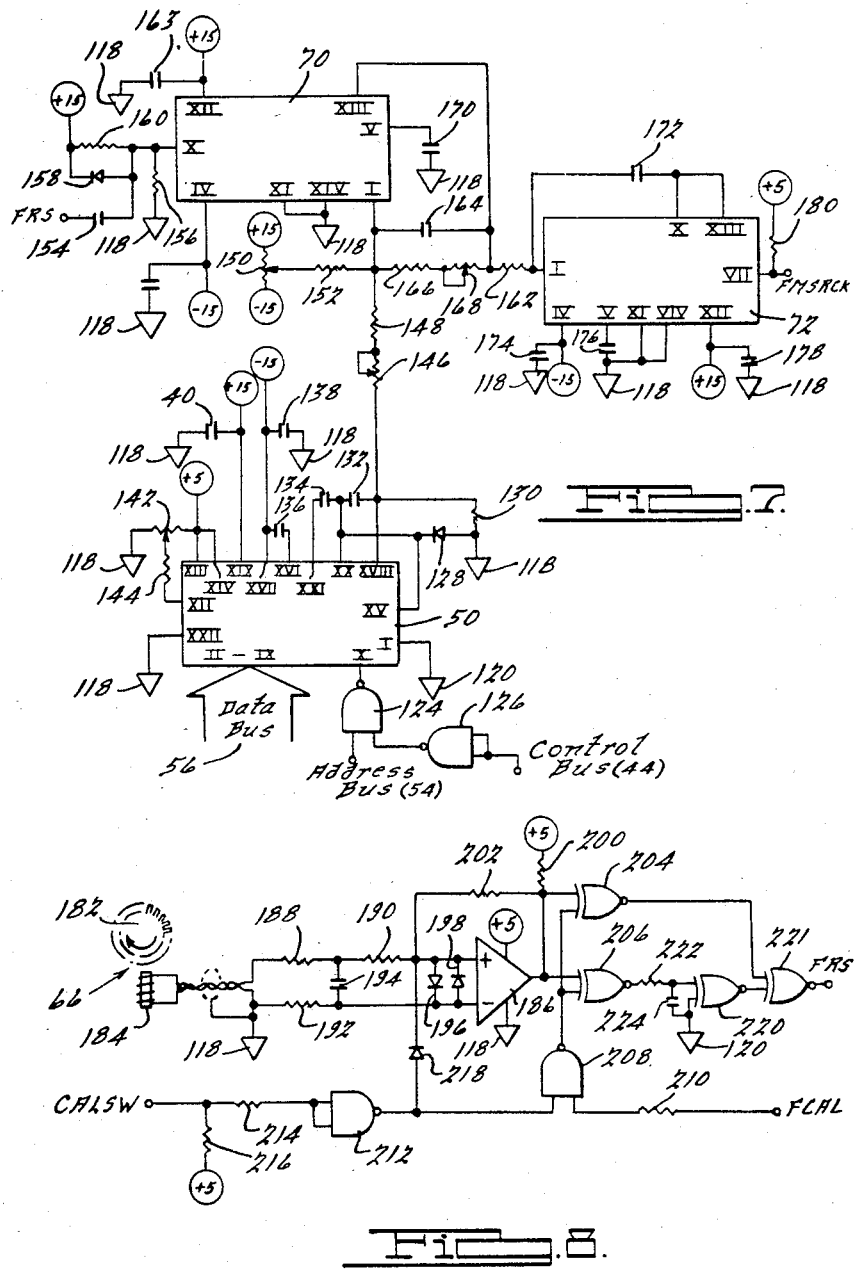

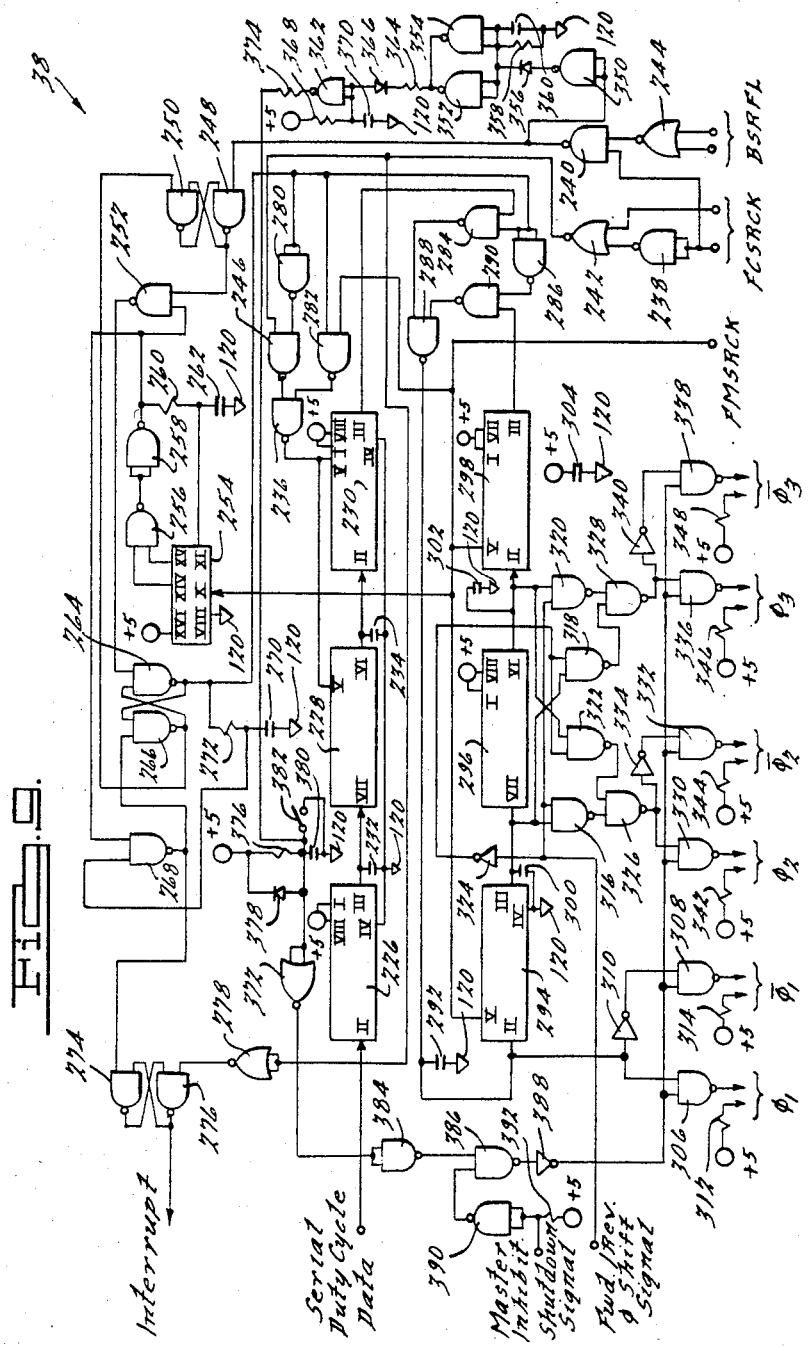

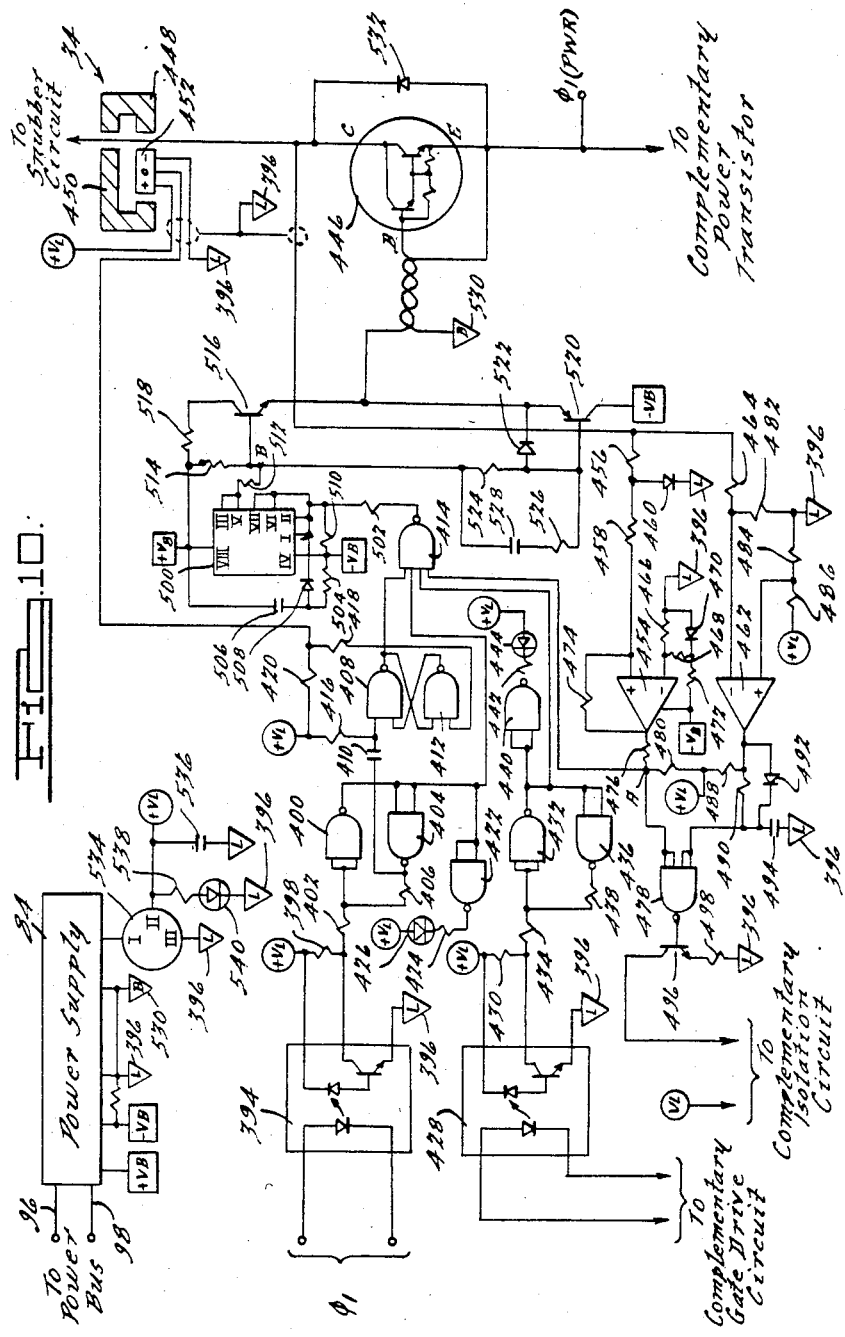

EV DRIVETRAIN INVERTER WITH V/HZ OPTIMIZATION

This is a continuation of application Ser. No. 338,743, filed Jan. 11, 1982, now abandoned which is a continuation of application Ser. No. 186,874, filed Sept. 12, 1980, now abandoned.

INTRODUCTION

The present invention relates to methods and apparatus for optimally controlling A.C. machines and specifically to such methods and apparatus which employ pulse width modulation, VVI, or other static switching control strategies. Furthermore, this invention relates, in its preferred embodiment, to the application of such apparatus within electric powered vehicles.

CROSS-REFERENCE

The subject matter of the present application is related to that disclosed in U.S. Ser. No. 036,118, filed May 4, 1979 and U.S. Ser. No. 055,139 filed July 5, 1979.

BACKGROUND OF THE INVENTION

The electric powered passenger vehicle has long been considered one of the most attractive alternatives to conventional interal combustion engine driven types from the standpoints of overall efficiency, environmental impact and, most recently, alternative fuel capability. Many commercial enterprises and private individuals, some under the auspices of the federal government, have proposed various approaches to implementing an electrically powered vehicle. To date, there have been virtually no commercially successful vehicles produced on a large scale.

A large number of approaches to the implementation and control of an electric vehicle are evidenced in the patent literature. Most of the approaches fall within one of three general categories of motive power source. These categories are hybrids, D.C. motor drives and induction motor drives.

The first type, the most frequently found in the patent literature, is the hybrid vehicle, comprising a small gasoline fueled internal combustion engine which mechanically drives an electrical generator which, in turn, supplies electrical energy to an A.C. or D.C. motor. With this arrangement, the gasoline engine can operate at a constant speed (at relatively high efficiency) and achieve a substantial fuel saving compared with an engine employing the conventional wide range of operation. A shortcoming of many hybrids is that they are relatively heavy, requiring an electrical generator and motor as well as the gasoline engine. Additionally, the engine requires substantial amounts of a volatile liquid fuel and generates exhaust emissions.

A second approach taken in the developmment of electric vehicles is the use of a bank of batteries which supply electrical energy to a D.C. motor. A variable speed motor drive circuit provides easy and versatile control of the vehicle. The principal advantage of this arrangement is that a D.C. motor control system requires a relatively simple power and control circuit. Unfortunately, this advantage is often more than offset by the relatively large initial cost and maintenance expenses of the motor itself. In addition, D.C. machinery is relatively heavy and bulky, factors which do not lend themselves well to implementation within a light-weight compact vehicle. Finally, D.C. motors inherently require choppers and commutators which create sparks and RF pollution whch can be controlled only at additional expense.

The third, and most attractive approach from the applicants' viewpoint, is an A.C. vehicle employing a battery bank and an induction motor. A.C. motors are relatively light-weight, inexpensive and efficient when compared to D.C. motors. A.C. induction motors, with no brushes or commutation, are more rugged and reliable than their D.C. counterparts and require substantially less maintenance. Related to power-to-weight ratio is the fact that A.C. machines can be driven at substantially greater speeds than D.C. motors. Because A.C. motors do not generate sparks, they can readily be employed in dusty, explosive and high humid atmospheres or high altitudes. Additionally, A.C. motors can be liquid cooled if the application so requires. Although typically superior to D.C. motors in electric vehicle application, A.C. motors often require complex control circuits which are dedicated to associated vehicle drivetrains.

Historically, A.C. motors on adjustable frequency excitation are operated at a constant terminal voltage per unit frequency (V/HZ). Such an arrangement is acceptable when the motor drives a relatively large and constant load. Under those conditions, the motor will operate at a relatively high level of efficiency. However, under light and/or varying load conditions, losses are encountered which can significantly reduce the motor's overall efficiency. When varying load conditions are anticipated, prior practice has been to establish a compromise constant V/HZ ratio which results in the maintenance of a tolerable efficiency level through the entire range of operation.

The relative low cost of electrical energy has, in the past, discouraged innovation in the area of optimal A.C. motor control. However, the recent precipitous increase in energy costs has altered priorities and dramatically increased the cost effectiveness of what heretofor were considered negligible efficiency improvements.

It will be apparent from a reading of the specification that the present invention may be advantageously utilized in many different control applications, both mobile and fixed. However, the invention is especially useful when applied to electric powered passenger commuter vehicles, which characteristically encounter widely varying motor load conditions, and will be described in connection therewith.

BRIEF DESCRIPTION OF THE INVENTION

The present invention provides an extremely efficient PWM inverter control apparatus that can be effectively used within electric vehicles or any system having an inverter to provide a power output to an A.C. machine at a preselectable frequency in the preselectable voltage. The control apparatus of the invention includes a control circuit which monitors the power delivered through the inverter as well as the torques demanded by the operator and delivered by the machine, and periodically varies the ratio of voltage and frequency as a function of the net change in power effected by a previous ratio variation during steady state conditions (when the torques are substantially equal). This arrangement has the advantage of providing an inverter control which periodically modulates the V/HZ ratio of the power output to maximize operating efficiency over widely varying load conditions by seeking to minimize power delivered through the inverter.

The optimizing control method of the invention includes the steps of monitoring the machine's operating point, periodically measuring the power delivered through the inverter during steady state conditions, incrementing or decrementing the V/HZ ratio, compairing successive power measurements to determine the net change in total power consumption effected by the ratio change and, finally, reversing the directional sense of subsequent ratio changes when and if the net change in total power-consumption is an increase. This method provides efficient control of an inverter by minimizing the power delivered by the inverter during system operation.

According to an aspect of the invention, means are provided to override V/HZ ratio variations when the torque demanded differs significantly from that presently being delivered by the machine. This arrangement has the advantage of affording the operator full acceleration or breaking of the machine when such operation is desired.

According to another aspect of the invention, the inverter has a power input from a fixed potential D.C. source, and the control cirucit monitors-current flowing from the D.C. source. This arrangement has the advantage of permitting monitoring the power delivered through the inverter by measurement of D.C. source current only.

According to still another aspect of the invention, the control scheme described hereinabove is applied within a drivetrain for an electric vehicle including a battery pack, an inverter and a three-phase induction motor. The application of the present invention within an electric vehicle is particularly advantageous because of the relatively high efficiencies which can be achieved over the widely varying torque and load demands.

These and other features and advantages of this invention will become apparent upon reading the following specification, which, along with the patent drawings, describes and discloses the preferred illustrative embodiment of the invention in detail.

The invention makes reference to the accompanying drawings.

BRIEF DESCRIPTION OF THE DRAWINGS

FIG. 3, represents various waveforms which are generated by the control apparatus of FIG. 2 when operated in the manner prescribed herein;

FIG. 6 is a block diagram of a software routine illustrating the main control loop in which optimized switch command signals and derived slip command signals are generated;

FIG. 7, is a schematic diagram of the digital to analog converter, frequency to voltage converter and voltage controlled oscillator illustrated in FIG. 4;

FIG. 8, is a schematic diagram of the speed signal conditioning circuit of FIG. 4;

FIG. 9, is a schematic diagram of the asynchronous waveform data interface of FIG. 4;

FIG. 10, is a schematic diagram of a complimentary half of one leg of the power bridge of FIG. 5;

ABREVIATIONS EMPLOYED IN SPECIFICATION

ADC . . . analalog to digital converter
BSRFL . . . buffer shift register full
CALSW . . . calibrating waveform switch signal
DAC . . . digital to analog converter
EV . . . electric vehicle
FCAL . . . calibration frequency
FCSRCK . . . frequency of computer shift register clock
FINR . . . frequency of input rotor
FMSRCK . . . frequency of master shift register clock
FRS . . . frequency of rotor signal
F/V . . . frequency to voltage converter
LED . . . light emitting diode
MPX . . . multiplexer
OP AMP . . . operational amplifier
PROM . . . programmable read only memory
RAM . . . random access memory
VCO . . . voltage controlled oscillator
VDC . . . volts direct current
V/HZ . . . volts per hertz

DETAILED DESCRIPTION OF THE PREFERRED EMBODIMENT OF THE INVENTION

Figure 1:
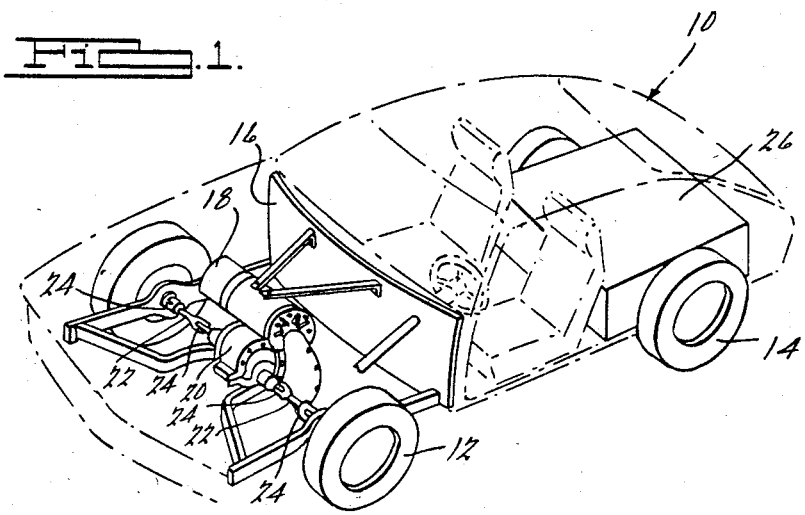
FIG. 1, is a perspective phantom view of an automobile incorporating the preferred embodiment of the present invention.

Referring to FIG. 1, packaging of the present invention within an electric vehicle (EV) 10 is conceptualized. Electric vehicle 10 is conventionally configured, having driven front wheels 12 and free rear wheels 14. An engine compartment, defined by the area forward of a firewall 16, contains a transversally mounted three-phase induction motor 18 which operates to drive wheels 12 through a two-speed transmission 20, drive shafts 22 and interconnecting u-joints 24. Motor 18 and transmission 20 are integrally formed within a common housing. The details of the front suspension have been deleted for the sake of simplicity. The mounting of motor 18 and transmission 20 as well as the independent front end suspension of EV 10 is so well known in the art as to require no elaboration here.

A ventilated compartment 26 disposed within EV 10 behind the driver and passenger seats contains a 144 VDC battery pack as well as an inverter and most of the control circuitry. Motor 18 and compartment 26 are electrically interconnected by appropriately sized cables (not illustrated). Additionally, provision must be made to periodically connect EV 10 with a source of charging current such as at the owner's home.

The present invention can be applied to applications other than electric vehicles. FIG. 1 isd intended only as an aid to the reader in conceptualizing the packaging as it would appear in a typical commuting passenger vehicle. The details of the illustrated arrangement are therefor not to be considered limiting in any sense.

Figure 2:
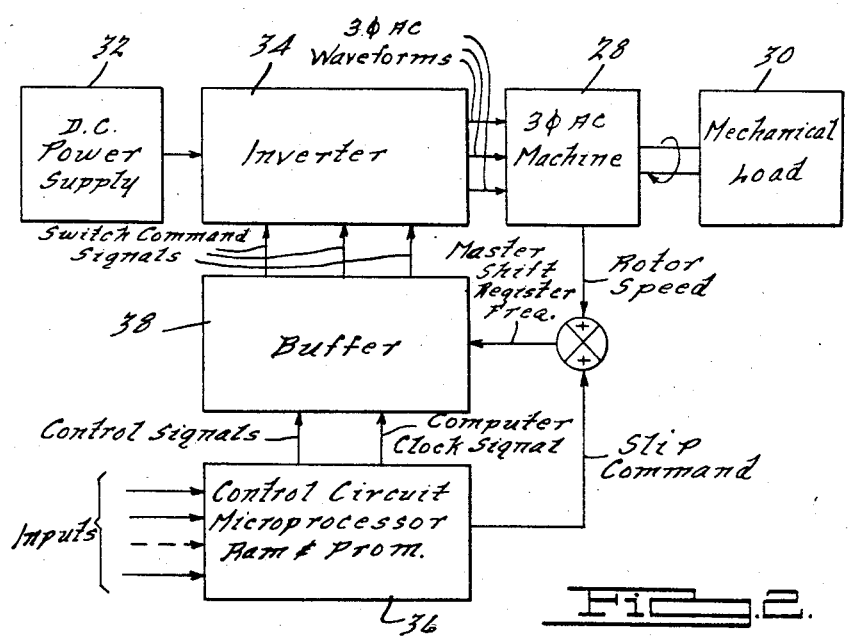
FIG. 2, is a block diagram of the pwm inverter control and its implementation within the drivetrain of the automobile of FIG. 1.
Figure 2:
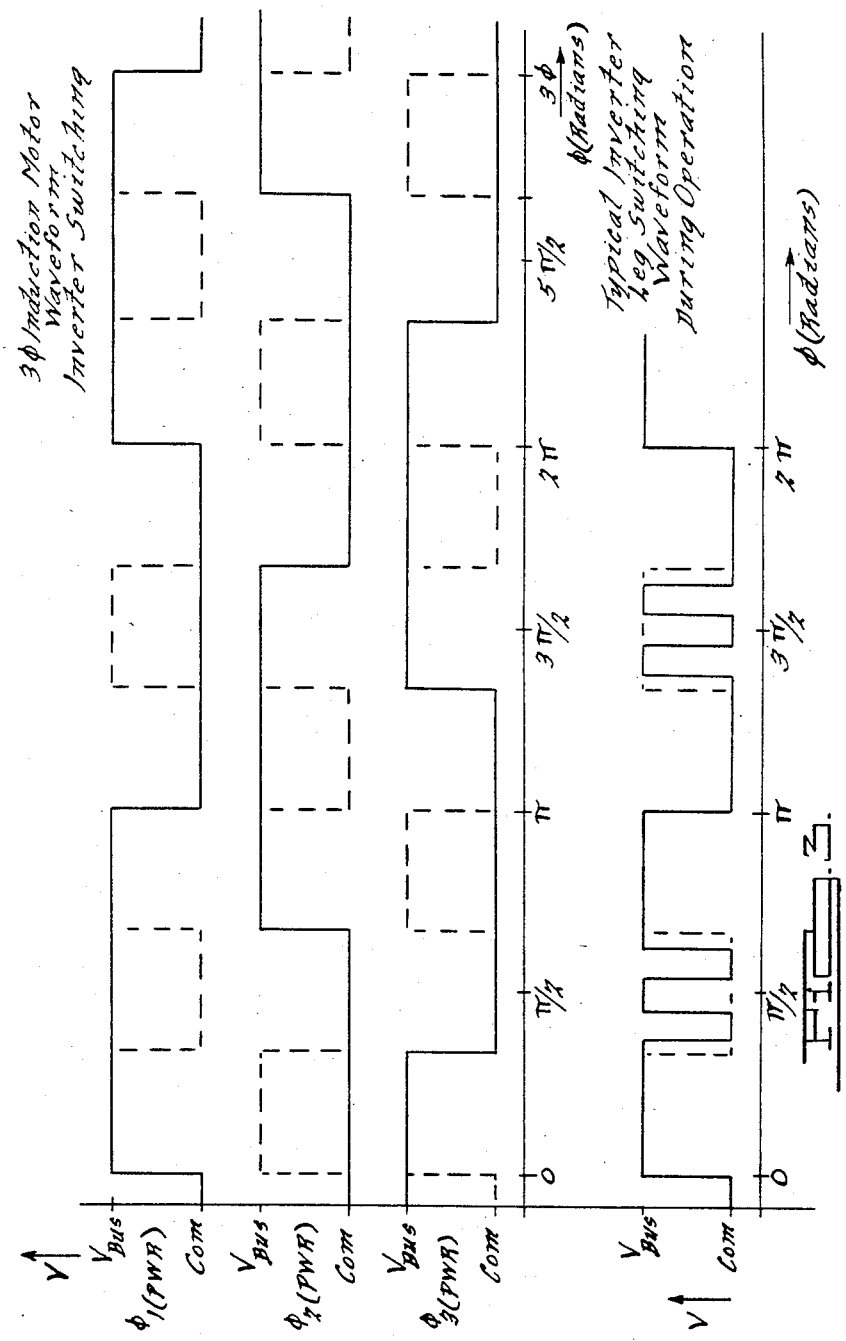

Referring to FIG. 2, a simplified block diagram of an EV drive package incorporating the present invention is illustrated. A three-phase A.C. present 28 drives a mechanical load 30 and is energized by a D.C. power supply 32 through an intermediate inverter 34. Inverter 34 converts direct current from power supply 32 into three-phase A.C. waveforms. Inverter 34 receives switch command signals from a control circuit 36 through an intermediate buffer 38. The duty cycle and wave shape data of the three-phase A.C. waveforms are determined by the switch command signals which are derived from a plurality of parametric inputs into control circuit 36.

The circuit of FIG. 2 operates a follows. Control circuit 36, which contains a microprocessor, random access memory (RAM) and programmable read only memory (PROM), receives various parametric inputs such as voltage, current and temperature levels as well as driver torque demand in the case where the present invention is applied to EV 10. Control circuit 36 then serves to determine the optimum slip and duty cycle information for a given torque demand as a function of the inputs and look-up tables contained in memory. Control signals containing duty cycle and wave shape data are then transferred to buffer 38 at a rate determined by a clock within control circuit 36. The control signals are momentarily stored in buffer 38 while a slip command signal from control circuit 36 is summed with a signal from A.C. machine 28 representing rotor speed, resulting in a master shift register frequency signal representative of the A.C. machine stator frequency. The control signals stored in buffer 38 are then synchronized with A.C. machine 28 and transferred to inverter 34 in a form of properly phased switch command signals.

This asynchronous data transfer technique permits the microprocessor in control circuit 36 to be non-dedicated and used for ancillary purposes while not generating waveforms. Such uses, in the preferred embodiment of the invention, are the monitoring of system limits, executing drive diagnostic routines, establishing operator readout, transforming driver command into output torque commands and optimizing volts per hertz (V/HZ) during steady state conditions. The control loop operates to track the slip command. The detailed embodiment of the invention will be described in connection with an application within EV 10. A.C. machine 28 is therefore considered to correspond with three-phase induction motor 18 but it is contemplated that A.C. machine 28 could also be a regenerative absorber or the like. Likewise, mechanical load 30 represents the torque applied by and to motor 18 by EV 10.

In the generation of control signals, control circuit 36 employs the technique of waveform notching which is well known in the art and described in detail in U.S. Pat. No. 3,538,420, issued Nov. 3, 1972 to F. N. Klein and which is incorporated herein by reference. Accordingly, for the sake of brevity, the details of this technique will be omitted in this specification.

Referring to FIG. 3, the format of the notching of the three-phase waveforms is illustrated. The first three wave forms in FIG. 3 illustrate the three separate waveforms corresponding with each phase to D.C. bus common labeled $\Phi_1$ (PWR), $\Phi_{2(PWR)}$ and $\Phi_{3(PWR)}$ respectively. The dotted lines in the waveforms represent the middle sixty degrees of each half cycle which is the space allocated for the notches, i.e., the maximum notch envelope. As is obvious to one skilled in the art, making the notches larger will reduce the percentage duty cycle or, to state it differently, if there were not notches, the duty cycle would be 100% and maximum voltage transfer to motor 18 would be achieved. On the other hand, if the full notch envelope were employed, the waveforms of the three-phase would be square waves in phase with one another, resulting in 0% duty cycle with no net voltage applied to the motor 18.

The fourth waveform in FIG. 3 shows the typical inverter leg switching waveform during operation in which two notices are symmetrically disposed within the envelope in each half cycle. Control of motor 18 is therefore achieved by selectively varying the notching within the envelope such as described in U.S. Pat. No. 3,538,420. There are numerous other notching schemes than that described in U.S. Pat. No. 3,538,420. Accordingly, the present invention is not to be limited to any particular single notching scheme.

Figure 4:
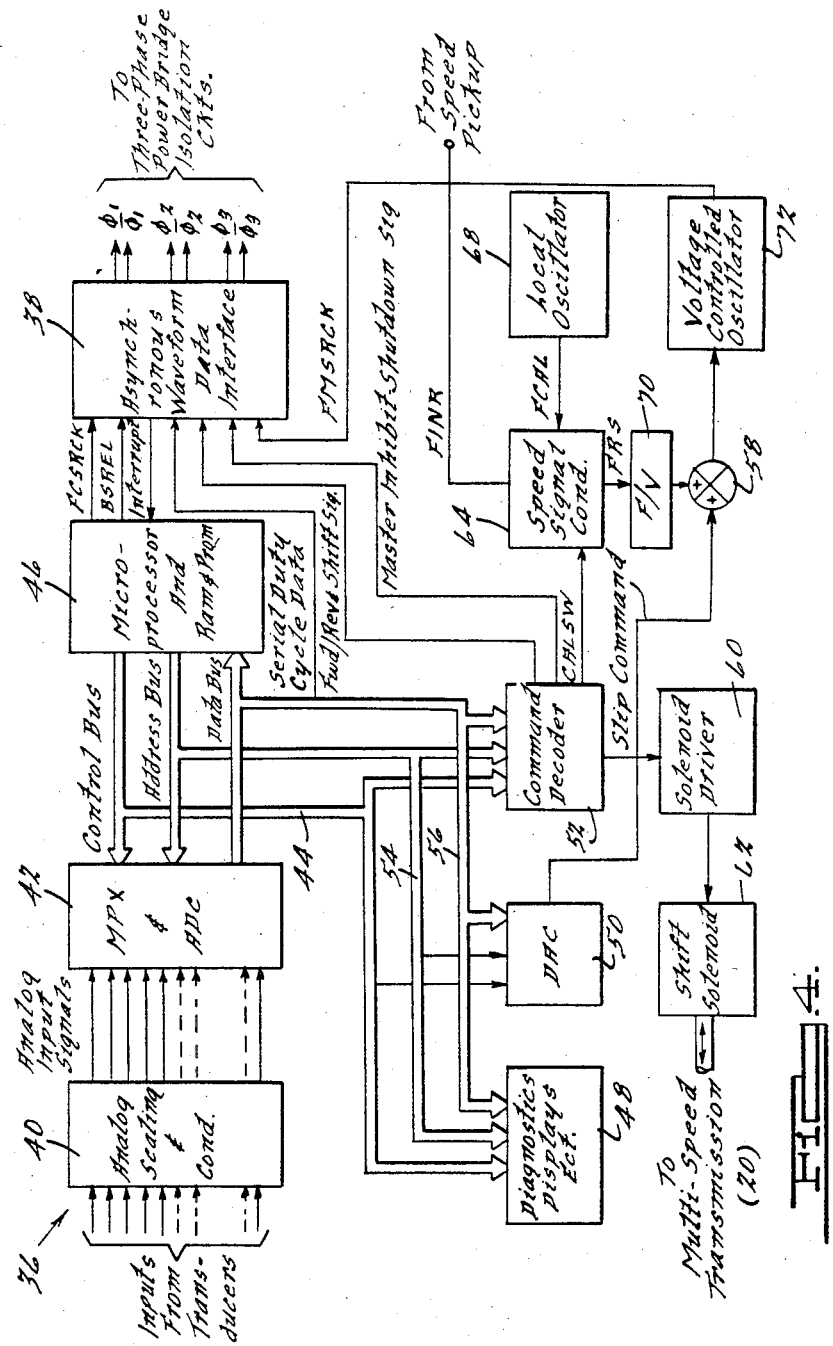
FIG. 4, is a partial block diagram of the control apparatus of FIG. 2.
Figure 5:
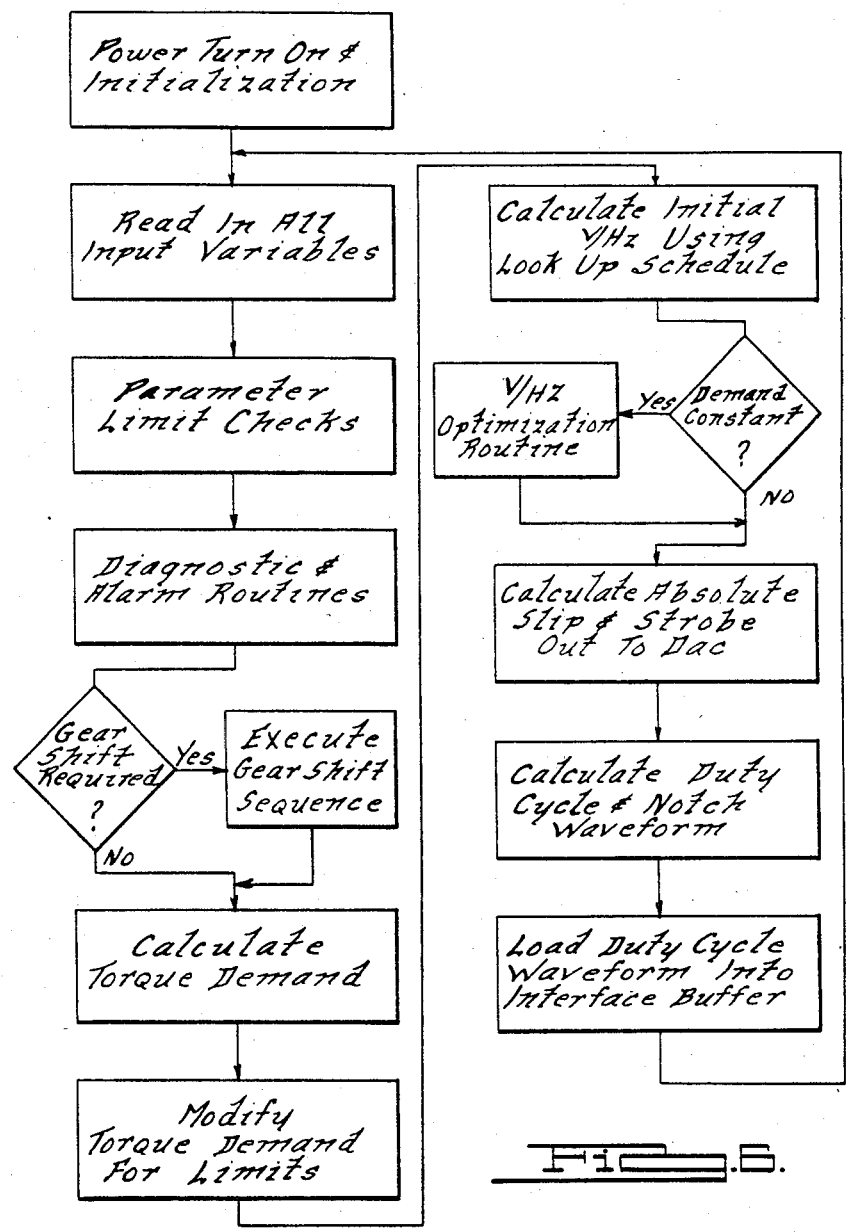
FIG. 5 is a partial block diagram, which, along with FIG. 4, expands upon the block diagram of FIG. 2.

Referring to FIGS. 4 and 5, a detailed block diagram of the present invention is illustrated. FIG. 4 generally comprises control circuit 36 and buffer or asynchronous waveform data interface 38. FIG. 5 illustrates an expanded inverter or three-phase power bridge 34, motor 18, transmission 20, and D.C. power supply or 144 VDC battery pack 32.

Referring to FIG. 4, the outputs from various temperature, current and voltage sensing transducers are connected to appropriate analog, scaling and conditioning (including zero-span where needed) circuits 40. The analog input signals from circuits 40 are connected to a 16 channel multiplexer (MPX) chip with analog to digital conversion (ADC) 42 such as that manufactured by National Semiconductor, Model ADC0816. Typical inputs received by analog scaling and conditioning circuits 40 are motor stator frequency, reference voltages, drift nulling signals, bus current, bus voltage, battery temperature, heat sink temperature, motor temperature, vehicle in motion indication, direction command, driver requested acceleration/deacceleration, brake signal, and various inputs for setting internal codes for diagnostics and displays. In addition, it is contemplated that other inputs may be desired for other applications. Accordingly, the recited inputs are not to be considered limiting.

A control bus 44 interconnects the microprocessor, RAM and PROM 46 with the MPX and ADC chip 42 as well as diagnostics and displays circuits 48, A digital to analog converter (DAC) 50 and a command decoder circuit 52. An address bus 54 and a data bus 56 likewise interconnect microprocessor 46, MPX and ADC 42, diagnostics and displays circuits 48, DAC 50 and command decoder 52.

DAC 50 operates upon command from microprocessor 46 to transmit a slip command signal to a summing junction 58. Command decoder 52, likewise upon direction from microprocessor 46 generates and routes a solenoid driver command signal to a solenoid driver 60 which, in turn, actuates a shift solenoid 62 which operates mechanically to change the gear ratio of transmission 20. Shift solenoid 62 could also be hydraulically linked to transmission 20 if it we located remotely therefrom. Command decoder 52 also operates to transmit microprocessor generated forward/reverse phase shift signals and master inhibit shutdown signals to interface 38. Command decoder 52 is effectively operating as an output latch for output control signals. Finally, command decoder 52 operates to transmit a calibrating frequency switch signal (CALSW) which is directed to a speed signal conditioning circuit 64.

Speed signal conditioning circuit 64 selectively passes a speed signal representative of input rotor freequency (FINR) derived from a speed pickup or tach 66 on motor 18 or a frequency calibration signal (FCAL) from a local oscillator 68. The output of speed signal conditioning circuit 64 is a scaled rotor frequency signal (FRS) which passes through a frequency to voltage (F/V) converter 70 to summing junction 58. Summing the slip command and converted FRS signals will result in an output signal from summing junction 58 whose voltage is proportional to stator frequency. This signal is passed to a voltage controlled oscillator 72, the output of which is a frequency representing a multiple of the motor stator frequency which will be referred herein as the frequency master shift register clock signal (FMSRCK) which is an input to interface 38. Serial duty cycle data is input to interface 38 directly from data bus 56. Separate control lines interconnect microprocessor 46 with interface 38, passing frequency of computer shift register clock (FCSRCK) and buffer shift register full (BFRSL) information to interface 38. An additional interrupt line connects interface 38 with microprocessor 46.

Interface 38 has three twisted output pairs labeled $\Phi_1$ and $\overline{\Phi}_1$, $\Phi_2$ and $\overline{\Phi}_2$ and $\Phi_3$ and $\overline{\Phi}_3$ which passes the synchronized and phased serial duty cycle data to three power bridge (inverter) 34 illustrated in FIG. 5. Each of the output pairs of interface 38 connect to one of the three legs or portions within bridge 34. It should be remembered that the preferred embodiment is intended to be illustrative only and that a motor of other than three phases could be employed within the scope of the present invention.

Because the circuitry within each of the three legs within power bridge 34 is identical with the others, the details of only one will be disclosed. Referring to FIG. 5, inputs for the first let from interface 38 are both connected to isolation circuits 71, and 74, each of which, in turn, are connected to complimentary gate drive logic circuits 76 and 78 respectively. Gate drive logic circuits 76 communicates with logic circuit 78 through an isolation circuit 80 and gate drive logic circuit 78 communicates with logic circuit 76 through a second isolation circuit 82. Separate bi-polar switching power supplies 84 and 86 supply power to gate drive logic circuits 76 and 78 respectively. The output of gate drive circuits 76 and 78 are connected to drivers 88 and 90 respectively which are also powered by power supplies 84 and 86 respectively. The output of drivers 88 and 90 are connected to the control inputs of power switches 92 and 94 respectively. A positive power bus 96 from battery pack 32 is connected to power supply 84 and power switch 92. A negative bus 98 from battery pack 32 is connected to power supply 86 and power swithc 94. Power switches 92 and 94 each have current and voltage sensing elements which are electrically connected gate drive logic circuits 76 and 78 respectively. The power output terminals of power switches 92 and 94 are commonly connected to one leg or coil of a wye connected motor 18. An additional output from each power switch 92 and 94 is connected an energy recovery circuit 100 which returns energy that would otherwise be lost during the collapse of inductive fields to busses 96 and 98. Each leg within power bridge 34 comprises two complimentary halves consisting of isolation circuit 74 (74), gate drive logic circuit 76 (78), power supply 84 (86), driver 88 (90), isolation circuit 80 (82) and power switch 92 (94). Gate drive logic circuits 76 and 78 are arranged so as to permit turning "on" only one power switch 92 or 94 at a time. If both power switches 92 and 94 were on simultaneously, a direct short would result between busses 96 and 98. This condition is not permissable and steps are taken to prevent such an occurrence.

The output shaft of motor 18 is connected to transmission 20 which, in turn, drives wheels 12 athrough differential gearing $20_a$ which in FIG. 1 is intergally housed with transmission 20 and motor 18.

The 144 VDC battery pack 32 comprises 12 volt automotive batteries which are connected electrically in series to busses 96 and 98 through a manually operated contactor 102 and an input filter 104. In-line fuses 106 and 108 are installed in busses 96 and 98 respectively. The output terminals of contactor 102 are also connected to an auxilary inverter, rectifier and regulator circuit 110 through in-line fuses 112 and 114. The output of regulator circuit 110 is connected to a logic and analog power supply 116 which provides a +5, ±15 outputs referenced to analog point 118 as well as an output logic voltage terminal and a reference digital common tie point 120. A conventional supplemental 12 VDC starting, lighting and ignition (SLI) battery 122 is also electrically connected to the input of power supply 116 to supply accessory vehicle loads.

Referring to FIG. 6, a flow diagram of the main control loop algorithm is illustrated. After contactor 102 is closed and power is established, and microprocessor 46 is initialized, all input variables from transducers are read in the memory and parameter limit checks are made. Such tests would include temperatures over limit, over speed condition, excessive current levels and over-/under bus voltage. At that point, any diagnostic and alarm routines are executed. Torque demand is then calculated from the operator controlled input and resulting demand modified if predetermined limits are exceeded. In such a case a large step demand for increased torque would be incrementally applied over a period of time. Once an in limit torque demand is established, an initial volts per hertz (V/HZ) ratio is calculated employing look-up tables established by the physical characteristics of motor 18 and stored in memory. If the torque demand made by the driver is constant or below a predetermined threshold, an ancillary V/HZ optimization routine is initiated to fine tune the V/HZ ratio to optimize overall operating efficiency i.e., to minimize bus current for given steady state conditions. Once the demand is determined to be not constant, microprocessor returns to the main program to calculate slip as function of the product of the motor constant and torque demand divided by the square of V/HZ. This value is strobed out to DAC 50. Next, the duty cycle and notch waveform is optimally calculated to form the best compromise between transistor switching rate constraints and harmonic losses due to the fact that the waveform is not sinusoidal. A detailed example of one method of so calculating duty cycle and notch wave forms is disclosed in U.S. Pat. No. 3,538,420. Briefly, the following steps are taken. The average motor line voltage is claculated from V/HZ and stator frequency data. Next, the optimum number of notches per notch envelope within each half cycle of the phase voltage waveforms is determined. The duty cycle is then calculated by dividing the average voltage by the bus voltage. Finally, the actual shape of the pulse waveform is determined using the above determined duty cycle and notch number information. This information is then loaded into interface 38 and the cycle completed by rereading all input variables.

As an additional feature, when a two or more speed transmission 20 is employed, a gear shifting function must be inserted in the above described routine. A convenient place would be immediately after execution of the diagnostic and alarm routines wherein as a function of motor and vehicle speed, operator input (torque demand) and stored constants, a gear shift requirement question would be posed which if answered negatively would continue the program and if answered affirmatively would cause the execution of the gear shift sequence prior to returning to the main program. The gear shift sequence comprises temporarily suspending torque demand from the operator and placing the motor under the full control of the processor (internal demand) during which a new set of shift speed ratios are established and finally, the actual gear shift execution is made. Subsequently, driver torque demand is re-established as an input.

Figure 6A:
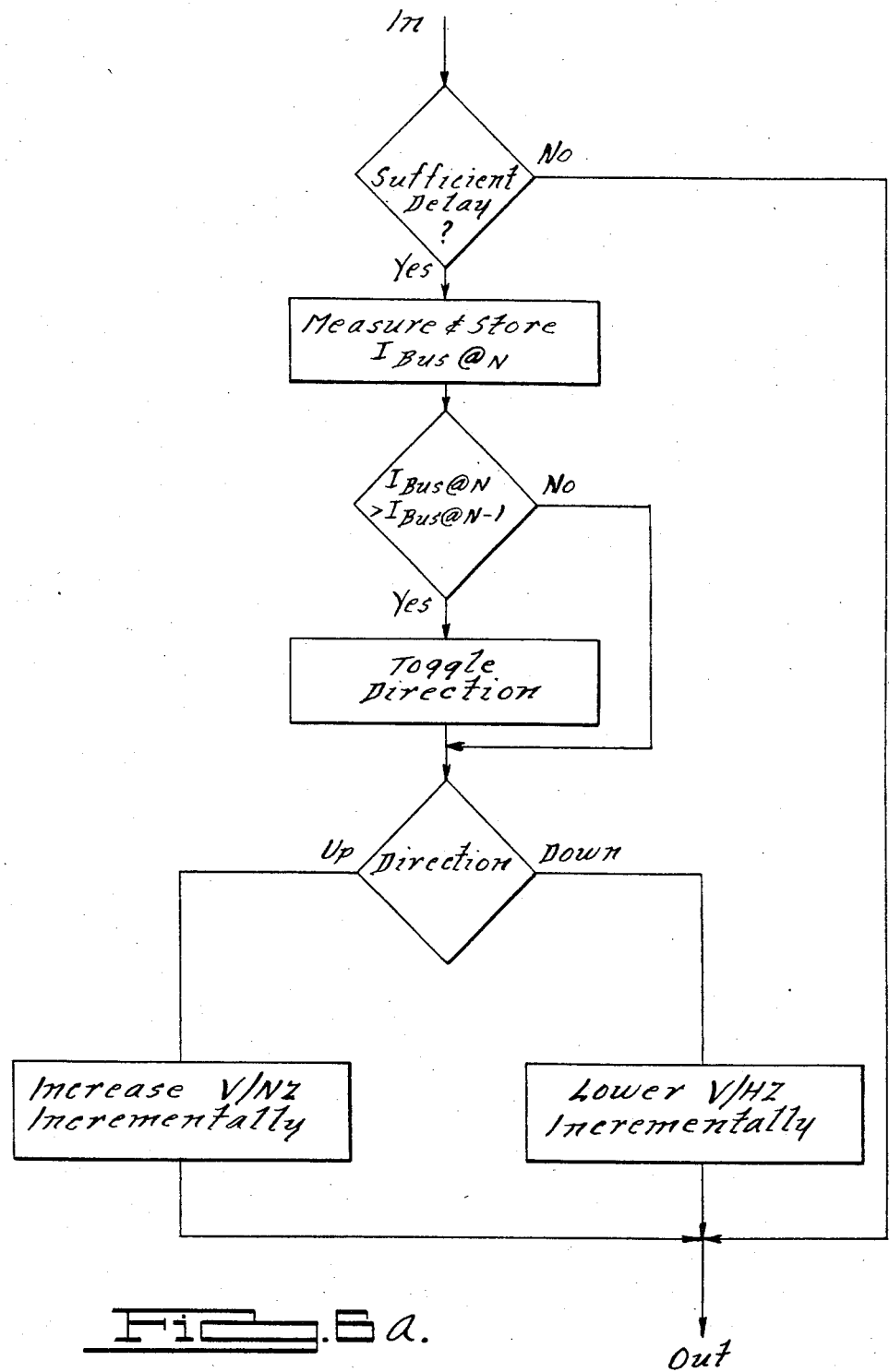
FIG. 6a is a block diagram of a software routine illustrating a secondary control loop in which the V/HZ ratio is optimized during steady state load conditions.

Referring to FIG. 6a, a flow diagram of the ancillary V/HZ optimization or secondary control routine algorithm is illustrated. During periods of time in which torque demanded by the driver substantially equals that delivered by the motor, the demand is deemed constant and the V/HZ optimization routine is serially inserted within the main control loop illustrated in FIG. 6.

Once inserted within the main control loop, the V/HZ optimization routine operates as follows: An internal timer determines if sufficient delay time has elapsed since the last V/HZ incremental adjustment to assure the measured perimeters are indicative of a true trend rather than a short term anomaly and that the motor has stabilized at some operating point. If the delay time is not sufficient, the program is gated directly back to the main control loop. If the delay time is sufficient, the power being delivered through inverter 34 is measured and the measurement stored. In the preferred embodiment of the invention, a fixed potential D.C. power source 32 is employed. In such a case, measurement of the bus current alone is sufficient to monitor power, current being proportional to power delivered. The power (bus current) from the last ratio adjustment or iteration is also retained in memory. The two current readings are then compared. If the most recent reading ($I_{bus}$ @$N$) reflects an increase in bus current over the earlier reading ($I_{bus}$ @$N-1$), a V/HZ incrementing/decrementing direction toggle is pulsed to change state whereby if the last V/HZ change was an increase, the next change will be a decrease, and vice versa. If the most recent reading reflects a decrease in bus current over the earlier reading, the program is gated around the direction toggle, which remains in the same state. The V/HZ ratio is then increased or decreased incrementally, depending upon its direction of change during the last iteration and whether or not the toggle has just been pulsed. Once the V/HZ ratio has been readjusted, the program returns to the main control loop to again calculate slip and strobe its value out to DAC 50. This process will continue as long as the demand remains constant whereby the V/HZ ratio will continuously be modulated to hunt for an optimal value where $I_{bus}$ is minimized for a given torque demand.

Referring to FIG. 7, a detailed schematic diagram of DAC 50, F/V converter 70 and voltage control oscillator circuit 72 is illustrated. Note that terminal designations by roman numeral refer to the specific referenced integrated circuit and that it is contemplated that other equivalent circuits can be substituted. Data bus 56 is connected to terminals II through IX of DAC 50 which is of the type marketed by Signetics, Model NE5018. A single line from address bus 54 is connected to one of the inputs of a nand gate 124, the output of which is connected to terminal X of DAC 50. One line of control bus 44 is connected to both inputs of a nand gate 126 the output of which is connected to the remaining input of nand gate 124. Terminal I of DAC 50 is connected to tie point 120. Terminal XXII of DAC 50 is connected to tie point 118. Terminals XX and XV of DAC 50 are commonly connected to tie point 118 through a back biased diode 128. Terminal XVIII of DAC 50 is connected to tie point 118 through a 4.7K ohm resistor 130 and to terminal XX through a 470 picofarad capacitor 132. Terminal XX of DAC 50 is also connected to terminal XXI through a 1000 picofarad capacitor 134. Terminals XVII and XVI of DAC 50 are interconnected by a 0.1 microfarad capacitor 136. Terminal XVII of DAC 50 is connected directly to the −15 VDC regulated power supply 116 and to tie point 118 through a 0.1 microfarad capacitor 138. Terminal XIX of DAC 50 is connected directly to the +15 VDC regulated power supply 116 and interconnected to tie point 118 through a 0.1 microfarad capacitor 140. Terminals XIII and XIV of DAC 50 are commonly connected to the +66 VDC regulated power supply 116 and interconnected to tie point 118 through the fixed resistor portion of a 10k ohm trim potentiometer 142. The wiper of potentiometer 142 is connected to terminal XII of DAC 50 through a 71.5 kohm resistor 144.

Terminal XVIII of DAC 50 is the output carrying slip command signals and is electrically interconnected to terminal I of F/V converter 70 through a series combination of the fixed resistor portion of 500 kohm potentiometer 146 and 234 kohm resistor 148. The wiper of potentiometer 146 is electrically connected to the commone tie point of potentiometer 146 and a resistor 148. F/V converter 70 is of the type manufactured by Burr-Brown type VFC32KP. Potentiometer 146 serves to calibrate the output of DAC 50.

Terminal I of F/V converter 70 is connected to the wiper of a 10 kohm potentiometer 150 through a 3.8 meg ohm resistor 152. The fixed terminals of potentiometer 150 are connected to the +15 VDC and −15 VDC power supply 116. Potentiometer 150 thereby serves as a zero calibration trimmer which eliminates any offset error which otherwise would be significant because slip is a relatively small percentage of the rotor frequency signals. The FRS signal is fed to the input terminal X of F/V converter 70 through a 470 picofarad coupling capacitor 154. Terminal X of F/V converter 70 is also connected to tie point 118 through a 4.7 kohm resistor 156 and to the +15 VDC power supply 116 through a parallel combination of a reverse biased diode 158 and a 22 kohm resistor 160. Terminal XII of F/V converter 70 is connected directly to the +15 VDC power supply 116 and to tie point 118 through a 0.01 microfarad capacitor 163. Output terminal XIII of F/V converter 70 is connected to terminal I of VCO 72 through a 33.2 kohm resistor 162 and to terminal I of F/V converter 70 through a 0.0056 microfarad capacitor 164. A series combination of a 30.1 kohm resistor 166 and the fixed terminals of a 20 kohm span trim potentiometer 168 is connected in parallel with capacitor 164. Output terminal V of F/V converter 70 is connected to tie point 118 through a 1800 picofarad capacitor 170.

The summed outputs of F/V converter 70 and the slip command signal are passed into VCO 72 at its terminal I. VCO 72 is of the type manufactured by Burr-Brown type VFC32KP. Terminal I of VCO 72 is also commonly connected to terminals X and XIII of VCO 72 through a 1000 picofarad capacitor 172. Terminal IV of VCO 72 is directly to the −15 VDC power supply 116 and interconnected to tie point 118 through a 0.01 microfarad capacitor 174. Terminals XI and XIV of VCO 72 are directly connected to tie point 118 and terminal V of VCO 72 is interconnected to tie point 118 through a 150 picofarad capacitor 176. Terminal XII of VCO 72 is directly connected to the +15 VDC power supply 116 and to tie point 118 through a 0.01 microfarad capacitor 178. Output terminal VII of VCO 72 is connected to the +5 VDC supply 116 through 1 kohm current limiting resistor 180. The signal at the output terminal VII of VCO 72 is FMSRCK which passes onto interface 38.

Referring to FIG. 8, a detailed schematic diagram of speed pickup 66 and associated speed signal conditioning circuit 64 is illustrated. A sixty tooth rotor gear 182 is mounted for rotation with the rotor of motor 18. A magnetic pickup sensor 184 is mounted to the stator of motor 18 adjacent the teeth of gear 182. Sensor 184 is of the type manufactured by Electro, Model 301-AN which operates to sense the passing teeth and thereby derive a signal representative of motor rotor speed. A pair of twisted leads from pickup 184 are interconnected to the + and − input of an op amp 186 through a series combination of two 56K ohm resistors 188 and 190 and a single 56 k resistor 192 respectively. Op amp 186 is also electrically connected to tie point 118 and to the +5 VDC power supply 116. The point of common connection between resistors 188 and 190 is connected to the negative input of op amp 186 through a 100 picofarad capacitor 194. The positive and negative inputs of op amp 186 are also interconnected by a pair of anti-parallel diodes 196 and 198.

The output of op amp 186 is connected to the +5 VDC power supply 116 through a 4.7 kohm biasing resistor 200 and to the positive input terminal of op amp 186 through a 750 kohm feed back resistor 202. The output of op amp 186 goes to one input of each of two exclusive nor gates 204 and 206.

The FCAL signal is transmitted on a line from local osxillator 68 which is connected to one input of a nand gate 208 through a 22 kohm resistor to 210. The output of nand gate 208 is commonly tied to the other two inputs of exclusive nor gates 204 and 206. CALSW signal is carried on a line from command decoder 52 which is connected to both inputs of a nand gate 212 through a 22 kohm resistor 214. The input line from command decoder 52 is also connected to the +5 VDC power supply 116 through a 4.7 kohm resistor 216. The output of nand gate 212 is connected to the remaining input of nand gate 208 and interconnected to the positive input of op amp 186 through diode 218.

The output of exclusive nor gate 206 is connected to one input of another exclusive nor gate 220 through a 22 kohm resistor 222. The other terminal of exclusive nor gate 220 is connected to tie point 120. The two input terminals of an exclusive nor gate 220 are interconnected by a 470 picofarad capacitor 224. The outputs of exclusive nor gates 204 and 220 are connected to the two inputs of an exclusive nor gate 221 whose output carries the FRS signal to F/V converter 70. Nand gate 208 operates to switch in the FACL and CALSW signals. The exclusive nor gates and the associated circuitry act as a frequency doubler.

Referring to FIG. 9, a detailed schematic diagram of interface 38 is illustrated. A line from data bus 56 carrying serial duty cycle date is connected to input terminal II of buffer shift register 226 which is of the type manufactured by Synertek, Model SYP2534. Buffer shift register 226 is ganged with two identical buffer shift registers 228 and 230, terminal III of buffer shift register 226 being connected with terminal VII of buffer shift register 228 and terminal VI of buffer shift register 228 being connected with terminal II of buffer shift register 230. Terminal IV of buffer shift register 226 is directly connected to digital tie point 120 while terminal III of buffer shift register 126 is interconnected to tie point 120 through a 470 picofarad capacitor 232. Terminals VIII of I of buffer shift register 226 are connected to the +5 VDC power supply 116. Terminal VI of buffer shift register 228 is connected to tie point 120 through a 400 picofarad capacitor 234. Terminal V of buffer shift register 228 and terminal V of buffer shift register 230 are commonly connected to the output terminal of a nand gate 236. Terminals I and VIII of buffer shift register 230 are connected to the +5 VDC power supply 116.

The line interconnecting microprocessor 146 and interface 38 which carries the FCSRCK signal actually comprises two conductors, one of which is connected to both inputs of a nand gate 238 and one of the inputs of another nand gate 240. The other line carrying the FCSRCK signal connects to one of the inputs of a nor gate 242. The output of nand gate 238 is connected to the other input or nor gate 242.

The line carrying the BSRFL signal from microprocessor 46 to interface 38 also comprises two conductors both of which terminate in the inputs of a nor gate 244. The output of nor gate 244 connected to the remaining input of nand gate 240. The output of nor gate 242 is connected to an input of a nand gate 246 the output of which is connected to one input of nand gate 236. The output of nand gate 240 is connected to one of the inputs of a nand gate 248 whose output is connected to one of the inputs of another nand gate 250. The output of nand gate 250 is connected to the remaining input of nand gate 248. This arrangement of gates comprises a latch, the operation of which is well known in the art. The output of nand gate 248 is also connected to one of the inputs of a nand gate 252.

The line transmitting the FMSRCK signal from VCO circuit 72 to interface 38 terminates in terminal X of a type 4040 twelve stage binary divider 254. Terminal XIV of divider 254 is connected to one input of a nand gate 256. Terminal XV of binary divider 254 is connected to the other input terminal of nand gate 256. The output of nand gate 256 is commonly connected to both inputs of another nand gate 258. Terminal VIII of divider 254 is connected to tie point 120 and terminal XVI of divider 254 is connected to the +5 VDC power supply 116. The output of nand gate 258 is connected to the remaining input of nand gate 252 and to tie point 120 through a series combination of a 6.8 kohm resistor 260 and a 100 picofarad capacitor 262. The point of common connection between resistor 260 and capacitor 262 is connected to terminal XI of divider 254.

The output of nand gate 252 is connected to an input of another nand gate 264 the output of which is connected to one of the inputs of another nand gate 266. The output of nand gate 266 is connected to the remaining input of nand gate 264, forming another latch. The output of nand gate 266 is connected to the remaining input of nand gate 250. The output of nand gate 258 is also connected to one of the inputs of another nand gate 268. The output of nand gate 268 is connected to the remaining input of nand gate 266. The remaining input of nand gate 268 is connected to tie point 120 through a 0.01 microfarad capacitor 270 and the output of nand gate 264 through a 22 kohm resistor 272.

The output of nand gate 268 is connected to one input of another nand gate 274 the output of which is connected to an input of another nand gate 276. The output of nand gate 276 is connected to the remaining input terminal of nand gate 274 to form an interrupt latch. The output of nand gate 276 is electrically connected to microprocessor 46 carrying the interrupt signal. The output of nor gate 242 is also connected both inputs of another nor gate 278 whose output is connected to the remaining input of nand gate 276. The output of nand gate 264 is connected to both inputs of a nand gate 280, one input of a nand gate 282 one input of another nand gate 284 and both inputs of still another nand gate 286. The output of nand gate 280 is connected to the remaining input of nand gate 246. The output of nand gate 282 is connected to the remaining input of nand gate 236. The remaining input of nand gate 282 is connected to terminal X of divider 254. The output of nand gate 284 is connected to an input of another nand gate 288. The output of nand gate 286 is connected to an input of another nand gate 290 the output of which is connected to the remaining input of nand gate 288.

The output terminal of nand gate 288 is connected to tie point 120 through a 470 picofarad capacitor 292 to an input terminal II of master shift register 294 which is ganged with two identical register 296 and 298 much the same as were buffer shift registers 226, 228 and 230. Terminal III of master shift register 294 is connected to terminal VII of master shift register 296. Terminal VI of master shift register 296 is connected to terminal II of master shift register 298. Terminal III of master shift register 298 is connected to the remaining input of nand gate 290. Terminals I of VIII of master shift register 296 and terminals I and VII of master shift register 298 are connected to the +5 VDC power supply 116. Terminal IV of master shift register 294 is directly connected to tie point 120. Terminal III of master shift register 294 is interconnected to tie point 120 through a 470 picofarad capacitor 300. Terminal V of master shift register 294 and terminal V of master shift register 298 are connected to terminal X of divider 254. Terminal VI of master shift register 296 is connected to tie point 120 through a 470 picofarad capacitor 302. A 0.01 microfarad capacitor 304 is interconnected between the +5 VDC power supply 116 and tie point 120 locally at each type 74L500 IC and each type SYP2534 IC device.

Terminal II of master shift register 294 is connected directly to one input of a nand gate 306 and interconnected to an input of another nand gate 308 through an inverter 310. The output of nand gate 306, paired with a reference line connected to the +5 VDC power supply 116 through a 200 ohm resistor 312 carries the switch command signal to leg one of the three power bridge 34. The output of nand gate 308, paired with another reference line connected to the +5 VDC power supply 116 through a 200 ohm resistor 314 comprises the complement signal to leg one of power bridge 34.

Terminal VII of master shift register 296 is connected to one input of nand gate 316 and one input of another nand gate 318. Terminal II of master shift register 298 is connected to one input of a nand gate 320 and one input of another nand gate 322. The line from command decoder 52 carrying the forward/reverse Φ-shift signal is connected directly to the remaining input terminals of nand gate 316 and 320 and interconnected to the remaining input terminals of nand gates 318 and 322 through an inverter 324. The output of nand gate 316 is connected to one input of a nand gate 316 and the output of nand gate 322 is connected to the remaining input of nand gate 326. The output of nand gate 318 is connected to one input of a nand gate 328 and the output of nand gate 320 is connected to the remaining input of nand gate 326 is connected directly to one input of a nand gate 330 and indirectly to one inpout of another nand gate 332 through an inverter 334. Likewise, the output of nand gate 328 is directly connected to one input of a nand gate 336 and indirectly to an input of another nand gate 338 through inverter 340. The output of nand gate 330, paired with a reference line connected to the +5 VDC power supply 116 through a 200 ohm resistor 342 is connected to leg two of power bridge 34. The output of nand gate 332, coupled with a reference line connected to the +5 VDC power supply 116 through a 200 ohm resistor 344 are also connected to the second leg of power bridge 34. The output of nand gate 336, coupled with a reference line connected to the +5 VDC power supply 116 through a 200 ohm resistor 346 is connected to leg three of power bridge 34 and the output of nand gate 338 coupled with a reference line connected to the +5 VDC power supply 116 through a 200 ohm resistor 348 is also connected to leg three of power bridge 34.

The output nand gate 240 is connected to both inputs of a nand gate 350 the output of which is connected to both inputs of nand gates 352 and 354 through a forward biased diode 356. The inputs of nand gates 352 and 354 are also connected to tie point 120 through a parallel combination of a 10 meg ohm resistor 358 and a 0.0068 microfarad capacitor 360. The output of nand gates 352 and 354 are commonly interconnected to both inputs of a nand gate 362 through a series combination of a 2.2 kohm resistor 364 and a reverse biased diode 366. The inputs to nand gate 362 are also interconnected to the +5 VDC power supply 116 through a 1.5 meg ohm resistor 368 and to tie point 120 through a 0.33 microfarad capacitor 370. The output of nand gate 362 is interconnected with both inputs of a nor gate 372 through a 2.2 kohm resistor 374. The input terminals of nor gate 372 are connected to the +5 VDC power supply 116 through a parallel combination of a 330 kohm resistor 376 and a reverse biased diode 378. The inputs of nor gate 372 are connected to tie point 120 through a parallel combination of a 1 microfarad capacitor 380 and a single pole single throw switch 382. The output of nor gate 372 is connected to both inputs of a nand gate 384 the output of which is connected to one of the inputs of a nand gate 386. The output of nand gate 386 is commonly interconnected to the remaining inputs of nand gates 306, 308, 330, 332, 336 and 338 through an inverter 388. The line carrying the master inhibit-shutdown signals from command decoder 52 is connected to both inputs of a nand gate 390 and interconnected to the +5 VDC power supply 116 through a 4.7 kohm resistor 392. The output of nand gate 390 is connected to the remaining input of nand gate 386.

In operation, interface 38 serially receives duty cycle data from the control circuit 36 (data bus 56 and temporarily stores that data in buffer shift registers 226, 228 and 230. circuitry associated with gates 266, 264, 268, 248, 250, 280, 264, 236, 288, 290, 284, 286, 242, 238, 244 and 240 operate as pulse steering gates which transfer the serial duty cycle data from the buffer shift registers 226, 228, and 230 to the master shift registers 294, 296 and 298. Divider 254, gates 256, 258 and 252 along with associated discrete circuitry, operate as a sync detector whereby switch command signals are gated from gates 306, 208, 330, 336 and 338 at a rate synchronized with motor 18. Gates 384, 386 and 390 function to inhibit the driver gates upon receiving a master inhibit-shutdown signal. Gates 316, 322, 318, 320, 326 and 328 provide the forward/reverse feed logic. Diode 378, resistor 376, capacitor 380 and switch 382 provide a reset circuit which is automatic upon power-up of the control circuit and can be manually initiated via switch 382. Finally, a failsafe shutdown system is provided via gates 350, 352, 354, 362 and their associated circuitry which inhibit the drive gates if a timely update command is not received.

Referring to FIG. 10, a schematic diagram of the top half of leg one of three $\Phi$ power bridge 34 is illustrated. The top half of leg one is defined as being that receiving the $\overline{\Phi}_1$ signal from interface 38 and the bottom half is defined as that portion receiving the inverse signa $\Phi_1$ from interface 38. The complementary (bottom) circuit portion of leg one of power bridge 34 is substantially identical to that disclosed in FIG. 10 and is deleted for sake of brevity. In addition, the schematic and operation of the circuits contained in legs 2 and 3 of power bridge 34 are identical to that of leg one.

The output of interface 38 carrying the $\Phi_1$ information is connected to the input terminals of an optical coupler 394 within leg one of power bridge 34. Optical coupler 394 is of the type manufactured by Hewlett-Packard, Model HP5082-4351 and corresponds with isolation circuit 71 in FIG. 5. The photo diode output of optical coupler 394 is connected to a $+V_L$ (logic) power supply. The emitter terminal of optical coupler 394 is connected to a logic common tie point 396. The collector output terminal of optical coupler 394 is interconnected with power supply $+V_L$ through a 3.3 kohm resistor 398 and interconnected with both inputs of a nand gate 400 through a 22 kohm resistor 402. The output of nand gate 400 is connected to both inputs of nand gate 40 through a 100 kohm resistor 406. Gates 400 and 404 and resistors 402 and 406 comprise a Schmidt trigger, the operation of which is well known in the art. The output of nand gate 404 interconnected to one of the inputs of another nand gate 408 through a 100 picofarad coupling capacitor 410. The output of nand gate 408 is connected to one input of another nand gate 412 the output of which is connected to the remaining input of nand gate 408. The output of nand gate 408 is also connected to one of the four inputs of a type 4012 nand gate 414. The input of nand gate 408 connected to capacitor 410 is also connected to the $+V_L$ power supply through a 56 kohm resistor 416. The remaining input of nand gate 412 is interconnected with $+V_L$ power supply through a series combination of a 22 kohm resistor 418 and an 820 ohm resistor 420. Nand gates 408 and 412 comprise an over current latch. The output of nand gate 400 is connected to another input of nand gate 414 and to both inputs of a nand gate 422. The output of nand gate 422 is connected to $+V_L$ power supply through a series connected 220 ohm resistor 424 and a light emitting diode (LED) 426. Nand gate 422, resistor 424 and LED 426 comprise a diagnostic circuit which will energize LED 426 should the input voltage level of nand gate 422 rise above $V_L/2$.

A second optical coupler 428 has its LED input connected to the complementary gate circuit 78 (see FIG. 5). The photo diode output terminal of optical coupler 428 is connected to the $+V_L$ power supply and the emitter output terminal is connected to tie point 396. The collector terminal of optical coupler 428 is interconnected with $+V_L$ power supply through a 3.3 kohm resistor 430 and interconnected to both inputs of a nand gate 432 through a 22k ohm resistor 434. The output of nand gate 432 is connected to both inputs of another nand gate 436 whose output is interconnected to the inputs of nand gate 432 through a 100 kohm resistor 438. Nand gates 432 and 436 and resistors 434 and 438 comprise a Schmidt trigger. The output of nand gate 432 is connected to one of the remaining inputs of nand gate 414 and to both inputs of a nand gate 440. The output of nand gate 440 is interconnected to $+V_L$ power supply through a series connected 220 ohm resistor 442 and LED 444. Nand gate 440, resistor 442 and LED 444 constitute a diagnostic test circuit. Optical coupler 428 is the equivalent of isolation circuit 80 in FIG. 5.

Power switch 92 as illustrated in FIG. 5 comprises a series connected snubber inductor (not illustrated) and a power transistor 446. Also included are voltage and current sensing circuits. Finally, an output to energy recovery circuit 100 is also embodied within power switch 92. The details of the snubber and energy recover circuit are the subject of a copending application referenced hereinabove. During the portion of the cycle of operation in which transistor 446 is conductive, the heavy current flow is through positive bus 96, the snubber inductor, transistor 446 and $\Phi_{1(PWR)}$ output line. During this period, the complementary power transistor within leg one is in the nonconductive state. In the portion of the cycle which transistor 446 is not conductive, the complementary power transistor in leg on may be conductive. In that case, the heavy current will be through the minus bus 98, the complementary snubber inductor and the complementary transistor.

Sensing of the collector current within power transistor 446 is accomplished by a magnetic circuit comprising two ferrite core pieces 448 and 450 and a hall effect switch 452 which is of the type manufactured by Sprague, Model UGS3019T. The collector lead of power transistor 446 is passed through a gap between ferrite core pieces 448 and 450 which is calibrated and adjusted to cause switch 452 to open or close at a predetermined collector current level. The positive terminal of switch 452 is connected to the $+V_L$ power supply and the negative terminal is connected to tie point 396. The output terminal of switch 452 is connected to the point of common connection between resistors 420 and 418. The leads from switch 452 are shielded and the shield is connected to tie point 396.

The voltage level (and negative current sense) of the collector of power transistor 446 is measured through a lead which is interconnected to the noninverting terminal of a negative current sense op amp 454 through a series combination of a 6.8 kohm resistor 456 and a 100 ohm resistor 458. The point of common connection between resistors 456 and 458 is connected to tie point 396 through a diode 460. The shielded lead from the collector of power transistor 446 is also interconnected with the inverting input of another voltage sensing op amp 462 through a 232 kohm resistor 464. The shield of the voltage lead is also connected to tie point 396. The inverting input of op amp 454 is connected to tie point 396 through a 10 kohm resistor 466. The inverting input of op amp 454 is also connected to tie point 396 through a series connected 18 kohm resistor 468 and diode 470. The point of common connection between resistor 468 and diode 470 is connected to a $-V_B$ power supply through a 1 kohm resistor 472. The output of op amp 454 is connected to its noninverting input through a 150 kohm resistor 474. The output of op amp 454 is interconnected with a node designated A through a 3 kohm resistor 476. Node A is directly connected to the remaining input of nand gate 414 and to two of the four inputs of a nand gate 478. Finally, node A is connected to the $+V_L$ power supply through a 4.7 kohm resistor 480.

The inverting input of op amp 462 is connected to tie point 396 through a 16.5 kohm resistor 482. The noninverting input of op amp 462 is connected to tie point 396 through a 16.5 kohm resistor 484 and to the $+V_L$ power supply through a 16.5 kohm resistor 486. The output of op amp 462 is connected to the $+V_L$ power supply through a 4.7 kohm resistor 488 and commonly to the two remaining inputs of nand gate 478 through a parallel combination of a 15 kohm resistor 490 and a forward biased diode 492. The two inputs to nand gate 478 associated with op amp 462 are also connected to tie point 396 through a 1000 picofarad capacitor 494. The output of nand gate 478 is connected to the base of a type 2N3414 transistor 496. The emitter of transistor 496 is interconnected to tie point 396 through a 390 ohm resistor 498. The collector of transistor 496 along with a lead from the $+V_L$ power supply are connected to complementary isolation circuit 80 (refer to FIG. 5).

The output terminal of nand gate 414 is interconnected with terminals I, II, VI and VII of a buffer 500 through a 20 kohm resistor 502. Buffer 500 is of the type manufactured by National Semi-Conductor, Model 8632N. Terminal IV of buffer 500 is connected directly to the $-V_B$ power supply and interconnected with terminal VIII of buffer 500 through a series combination of a 10 kohm resistor 504 and 4.7 microfarad capacitor 506. Terminal I of buffer 500 is interconnected with the point of common connection between resistor 504 and capacitor 506 with a reverse biased diode 508. Terminal I of buffer 500 is interconnected to the $-V_B$ power supply through a 30 kohm resistor 510. Terminal VIII of buffer 500 is connected to the $+V_B$ power supply. Terminals III and V are commonly interconnected to a node B through a 10 ohm resistor 512. Node B is connected to the $+V_B$ power supply through a 30 ohm resistor 514 and directly to the base of a type D44H2 transistor 516 of the type manufactured by General Electric Corporation. The collector of transistor 516 is interconnected to the $+V_B$ power supply through a 0.40 ohm resistor 518. The emitter of transistor 516 is connected, through one lead of a twisted pair to the base terminal of power transistor 446 which is of the type manufactured by Toshiba, Model 2SD648. The emitter of transistor 516 is also connected to the emitter of a transistor 520 which is of the type manufactured by General Electric, type D45H2. The collector of transistor 520 is connected to the $-V_B$ power supply. The base of transistor 520 is connected to its emitter through a diode 522 and to node B through a parallel combination of 680 ohm resistor 524 and a series connected 56 ohm resistor 526 and a 0.47 microfarad capacitor 528.

The other lead in the twisted pair inter connects the emitter of transistor 446 with a power common tie point 530. Finally, a type GEA397 fly back or inverse parallel diode 532 interconnects the collector and emitter of transistor 446.

The dual switching power supply 84 supplies only the circuit illustrated in FIG. 10. Five other identical power supplies are provided to individually power the complimentary circuit in leg one as well as the circuits in legs two and three. Power supply 84 has output terminals $+V_B$ and $-V_B$. The level of those voltages will depend upon the specific components used in an implementation of the present invention. Power supply 84 also has common connections to tie points 396 and 530. The $+V_L$ power source is derived from §13 volt unregulated tap from power supply 84 which is connected to terminal I of a type SF7808C regulator 534. Output terminal II of regulator 534 is connected to tie point 396 through a 47 microfarad capacitor 536 and represents the output terminal $+V_L$. Terminal II of regulator 534 is also connected to tie point 396 through a series combination of a 470 ohm resistor 538 and a LED 540. LED 540 serves as a diagnostic aid. Output terminal III of regulator 534 is connected to tie point 396. The plus and minus buses 96 and 98 provide electrical energy to power supply 84. Note that only one half of power supply 84 is illustrated. The other half provides a $+V_B$, $-V_B$ and referenced tie points 396 and 530 to the complimentary base drive circuit within leg one while maintaining a large breakdown voltage isolation between the two supplies.

In operation, the circuit of FIG. 10 receives the switch command signals pertaining to phase one of motor 18 from interface 38. This is isolated from the gate drive logic 76 by optical coupler 394. The output from optical coupler 394 is passed through a Schmidt trigger to clean up the waveform and provide sharp transistions. The output of the Schmidit triggers is fed directly to a four input gate and couples as a reset into a overcurrent latch which is set via the current sensing lines operating on pull up resistor 420. The output of the current latch is also fed to gate 414. An enabling signal from the complimentary gate drive circuit is first isolated by optical coupler 428, passed through a Schmidt trigger and then fed into an input of gate 414. Finally, op amp 454 operates as a comparator to sense power transistor negative voltage indicating current in diode 532 and transmit an inhibit signal to gate 414. The output of gate 414 controls the operation of power transistors 446 through buffer 500 and its associated circuitry. Thus, in order for transistor 446 to become conductive, the following four outputs must be received by gate 414: (1) command from microprocessor 46, (2) enable signal from complimentary gate drive 78, (3) overcurrent latch reset and, (4) no negative current sensed through fly back diode 532.

Capacitor 528 and resistor 526 operate to provide a low resistance path during the turn off of power transistor 446. Resistors 456 and 458 along with diode 460 provide a level shift and protective clamp for op amp 454. Diode 508, resistor 504, and capacitor 506 constitute a power-on reset circuit. The output of op amps 454 and 462 are passed through gate 478 to the complimentary gate drive logic 78 through isolation circuit 80. This arrangement assures that both power transistors in a single leg will never be in the conductive state at the same time.

Figure 11:
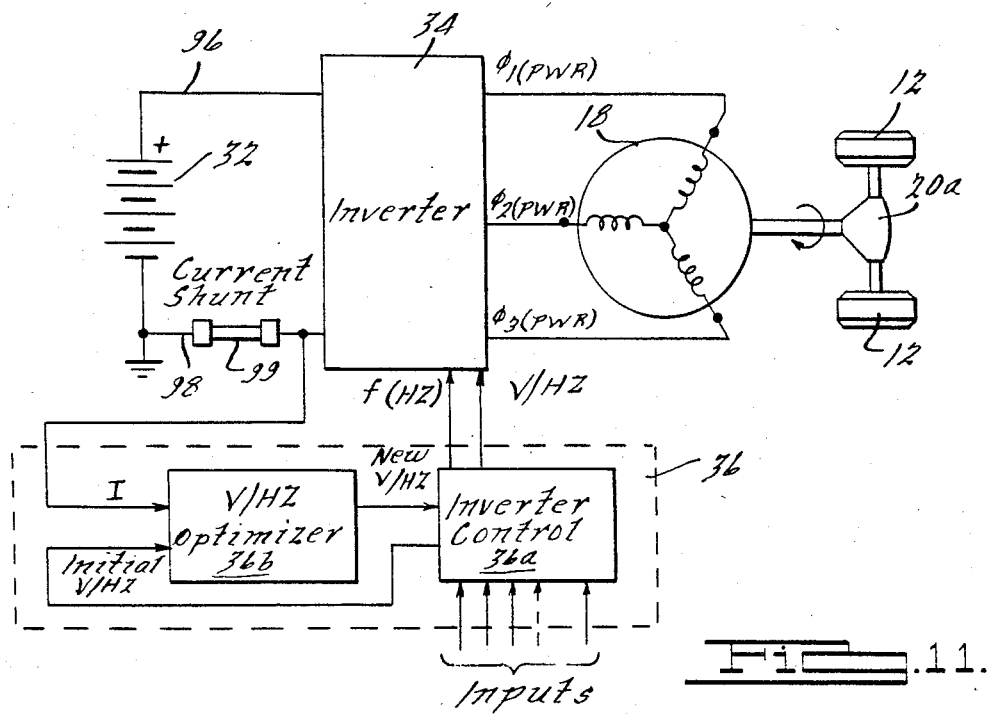
FIG. 11, is a modification of the block diagram of FIG. 2 which illustrates the V/HZ optimization function of the present invention.

To reiterate and more clearly define the present invention, referring to FIG. 11, a simplified block diagram of the present invention is illustrated. FIG. 11 functionally corresponds with the diagram of FIG. 2 but is illustrated to highlight the V/HZ optimizaiton aspect of the invention as much as possible whereas FIG. 2 illustrates the overall control strategy of the present invention.

The present invention, in its preferred embodiment, is a microprocessor based inverter control circuit which seeks the most efficient operating point of an A.C. machine by incrementally adjusting its V/HZ ratio during periods of constant torque to minimize the total power consumed. This activity is ancillary to overall inverter control and is interrupted when torque demand varies.

FIG. 11, represents the same D.C. power supply 32, inverter 34, 3Φ induction motor 18 (3Φ A.C. machine 28), and differnetial 20A (mechanical load 30) of FIG. 2. Buffer 38 has been eliminated in FIG. 11, control circuit 36 being directly connected to inverter 34. Control circuit 36 comprises a V/HZ optimizer circuit 36b and an inverter control 36a. Control circuit 36a receives parametric inputs, and outputs initial V/HZ information to optimizer circuit 36b and frequency and V/HZ information to inverter 34. Optimizer circuit 36b also receives current level information from −Bus 98 via a current shunt 99, and outputs new or updated V/HZ information to control circuit 36a. The optimizer circuit 36b operates as described in the discussion relating to FIGS. 6 and 6a and should be obvious to one of ordinary skill in the art in light of the present specification. Optimizer circuit 36b is implemented in the preferred embodiment of the invention within software and microprocessor 46 (see FIG. 4), FIG. 11 being a shorthand method of pictorially illustrating the inventive method.

Feedback of frequency, speed and/or torque information is not illustrated in FIG. 11 inasmuch as it would be obvious should actual feedback be desired. However, in the preferred embodiment of the invention the "feedback" is derived to eliminate the need for a hard wired feedback circuit.

Figure 12:
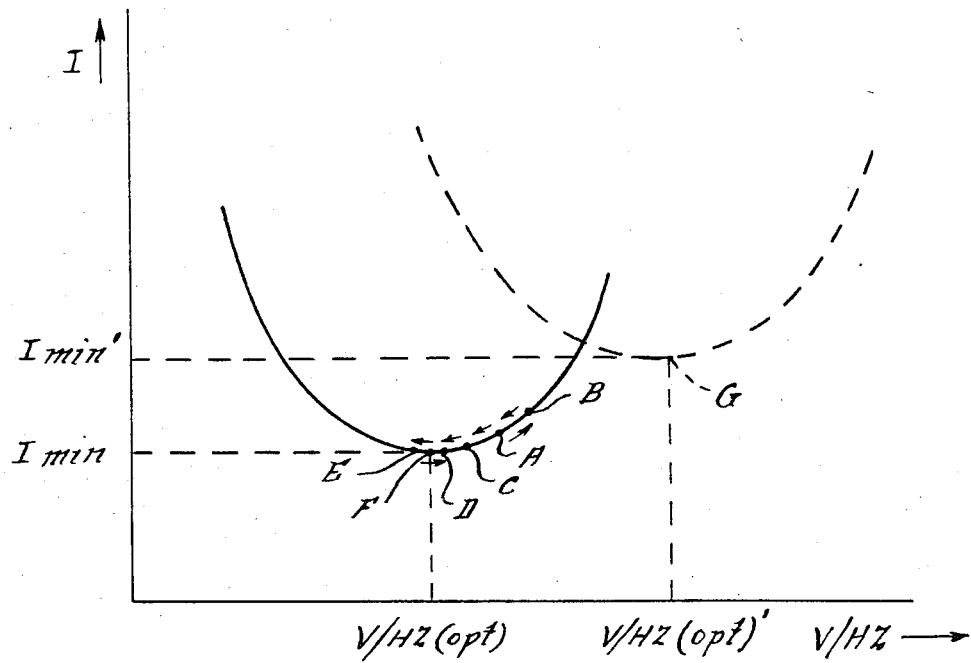
FIG. 12, is graphical presentation of a typical illustrative V/HZ optimization process.

FIG. 12 graphically presents an example where, during periods of constant torque demand, the system seeks a minimum current ($I_{min}$) level which is the point of minimum power consumption. For a given constant torque demand level, the system will have a characteristic bus current −V/HZ ratio relationship as illustrated in solid line wherein an optimal V/HZ ratio will minimize bus current and any change in V/HZ will effectively increase bus current.

In the example, it is assumed that the system detects a constant torque demand condition whereupon the system is operating at point A of the curve. Also assuming that the toggle (FIG. 6a) was in the "increase" position from a prior application, the V/HZ ratio will be increased incrementally to point B. However, on the next control loop cycle, the increase in bus current (from A to B) will be sensed and the toggle pulsed to the "decrease" condition. On the next control loop cycle, the V/HZ ratio will be incrementally decreased back to point A. Sensing a net decrease in bus current (and power), the control circuit will maintain the toggle in the "decrease" condition. On the next cycle, the V/HZ ratio will be decreased to point C. Again, a decrease in current will be sensed and, on the next cycle, the V/HZ ratio will again be decreased to point D. On the next cycle, having sensed a current decrease on the last cycle, the control circuit will again reduce the V/HZ ratio to point E. This time however, a slight increase in current (from point D to point E) is sensed and the toggle will again be pulsed. Because of the finite nature of the incremental V/HZ ratio changes, the circuit will vacillate between point D and E. In any event, the system will settle out within ±1 increment of the ideal or absolute minimum bus current in the curve. It is contemplated that the size of the V/HZ ratio incremental changes could be reduced to the point that efficiency differences in operation between points D and E, and alternatively, precisely at point F, the absolute minimum bus current level on the curve, would be inconsequential.

Once a change in demanded torque is sensed the entire characteristic curve shifts, for example, to the position suggested by the dotted curve in FIG. 12. At that time, the actual operating point may be anywhere along the new curve and once demanded torque again stabilizes, the control circuit will again seek out the new minimum bus current (at point G).

It is to be understood that the invention has been described with reference to a specific embodiment which provides the features and advantages previously described, and that such specific embodiment is susceptible of modification, as will be apparent to those skilled in the art. For example, although described as a method and apparatus for minimizing energy usage in an A.C. machine, the present invention can also be employed to improve the transient (acceleration and/or deacceleration) performance of an A.C. machine. It is also to be understood that although described in the environment of an electric vehicle, in its broadest sense, the present invention can be adapted for other applications. Accordingly, the foregoing description is not to be construed in a limiting sense.

What is claimed:

1. An electric vehicle drivetrain comprising:
   a D. C. power supply;
   and A.C. induction motor for driving at least one ground engaging vehicle wheel;
   an inverter which receives an input from said power supply through a substantially fixed D.C. bus and provides a PWM power output to said motor at a preselectable frequency and a preselectable voltage; and
   a control circuit operative to monitor current delivered through said bus, vehicle operator torque demand and torque delivered by said motor to said wheel, and periodically selectively adjust the ratio of said voltage and frequency only when said torques are substantially equal, as a function of a monitored net change in current effected by a previous ratio variation to minimize input energy through said bus under steady state operating conditions.

2. The drivetrain of claim 1, further comprising means operative to override said ratio variation when the torque demand is not substantially equal to said delivered torque.

3. The drivetrain of claim 2, wherein said override means is incorporated within said control circuit.

4. The drivetrain of claim 1, wherein said ratio variations are in discrete increments.

5. The drivetrain of claim 1, wherein said control circuit monitors the current flowing within said D.C. bus.

6. The drivetrain of claim 1, wherein said A.C. motor is a three-phase induction motor.

7. The drivetrain of claim 1, wherein said control circuit comprises means for generating and momentarily storing said voltage-frequency ratio.

8. The drivetrain of claim 1, wherein said control circuit comprises means operative to compare said demanded torque and machine delivered torque.

9. The drivetrain of claim 1, wherein said voltage/frequency ratio is varied as a function of the net change in current effected by the immediately preceding ratio variation.

* * * * *